United States Patent
Pinheiro et al.

(10) Patent No.: US 8,332,702 B2
(45) Date of Patent: Dec. 11, 2012

(54) METHOD AND APPARATUS FOR HYBRID AUTOMATIC REPEAT REQUEST TRANSMISSION

(75) Inventors: Ana Lucia Pinheiro, West Chester, PA (US); Mohammed Sammour, Montreal (CA); Shankar Somasundaram, Deer Park, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1379 days.

(21) Appl. No.: 11/968,979

(22) Filed: Jan. 3, 2008

(65) Prior Publication Data

US 2008/0215948 A1    Sep. 4, 2008

Related U.S. Application Data

(60) Provisional application No. 60/883,470, filed on Jan. 4, 2007.

(51) Int. Cl.
 *H04L 1/18* (2006.01)
(52) U.S. Cl. ........................ 714/748
(58) Field of Classification Search ............ 714/748, 714/749
 See application file for complete search history.

(56) References Cited

U.S. PATENT DOCUMENTS

| | | | | |
|---|---|---|---|---|
| 5,745,502 A * | 4/1998 | Khayrallah et al. | ........ | 714/751 |
| 6,542,718 B1 * | 4/2003 | Kuo et al. | ........ | 455/69 |
| 6,662,330 B1 * | 12/2003 | Hershey | ........ | 714/748 |
| 7,159,162 B2 * | 1/2007 | Ludwig et al. | ........ | 714/748 |
| 7,188,293 B2 * | 3/2007 | Park | ........ | 714/748 |
| 7,477,622 B2 * | 1/2009 | Attar et al. | ........ | 370/329 |
| 7,525,908 B2 * | 4/2009 | Olsson et al. | ........ | 370/229 |
| 7,564,819 B2 * | 7/2009 | Khan | ........ | 370/335 |
| 7,573,820 B2 * | 8/2009 | Krishnaswamy et al. | .... | 370/235 |
| 7,636,328 B2 * | 12/2009 | Teague et al. | ........ | 370/277 |
| 7,668,102 B2 * | 2/2010 | Li et al. | ........ | 370/236 |

(Continued)

FOREIGN PATENT DOCUMENTS

EP    1 398 897    3/2004

(Continued)

OTHER PUBLICATIONS

Third Generation Partnership Project, "Technical Specification Group Radio Access Network, Evolved Universal Terrestrial Radio Access (E-UTRA) and Evolved Universal Terrestrial Radio Access Network (E-UTRAN), Overall description, Stage 2 (Release 8)", 3GPP TS 36.300 V0.2.0 (Nov. 2006).

(Continued)

*Primary Examiner* — James C Kerveros
(74) *Attorney, Agent, or Firm* — Eric Berkowitz; Theodore Naccarella

(57) ABSTRACT

A method and apparatus for hybrid automatic repeat request (HARQ) transmission are disclosed. If a packet has not been successfully transmitted, it is determined whether an HARQ early termination condition is met. If the HARQ early termination condition is met, the HARQ process is terminated and the packet is discarded at the HARQ level. The HARQ early termination condition is met if a positive acknowledgement (ACK) has not been received until the number of retransmissions reaches a predetermined limit that is dynamically configured based on channel condition, measurement, etc. Alternatively, the HARQ early termination condition is met if a transmit power required for successful transmission of the packet is much higher than an actual transmit power. Alternatively, the HARQ early termination condition is met if a transport format combination (TFC) selected for retransmission is different from an optimal TFC. A higher layer may be notified of the early HARQ termination.

46 Claims, 1 Drawing Sheet

U.S. PATENT DOCUMENTS

| | | | |
|---|---|---|---|
| 7,719,991 B2 * | 5/2010 | Bhushan et al. | 370/252 |
| 7,788,566 B2 * | 8/2010 | Vitebsky et al. | 714/748 |
| 7,852,803 B2 * | 12/2010 | Kim | 370/328 |
| 7,986,676 B2 * | 7/2011 | Waxman | 370/338 |
| 8,050,247 B2 * | 11/2011 | Kim et al. | 370/349 |
| 2003/0020654 A1 | 1/2003 | Navarro et al. | |
| 2005/0251722 A1 | 11/2005 | Terry | |
| 2006/0007880 A1 | 1/2006 | Terry | |
| 2006/0013216 A1 | 1/2006 | Rajkotia et al. | |

FOREIGN PATENT DOCUMENTS

| | | |
|---|---|---|
| EP | 1 643 794 | 5/2006 |
| WO | 2004/042993 | 5/2004 |

OTHER PUBLICATIONS

Third Generation Partnership Project, "Technical Specification Group Radio Access Network, Evolved Universal Terrestrial Radio Access (E-UTRA) and Evolved Universal Terrestrial Radio Access Network (E-UTRAN), Overall description, Stage 2 (Release 8)", 3GPP TS 36.300 V0.3.1 (Nov. 2006).

Third Generation Partnership Project, "Technical Specification Group Radio Access Network, Evolved Universal Terrestrial Radio Access (E-UTRA) and Evolved Universal Terrestrial Radio Access Network (E-UTRAN), Overall description, Stage 2 (Release 8)", 3GPP TS 36.300 V8.3.0 (Dec. 2007).

"3rd Generation Partnership Project; Technical Specification Group Radio Access Network; Medium Access Control (MAC) protocol specification (Release 7)", 3GPP, Dec. 2007, 23 pages, TS 36.321 8.0.0.

"3rd Generation Partnership Project; Technical Specification Group Radio Access Network; Medium Access Control (MAC) Protocol Specification (Release 7)", 3GPP, Dec. 2006, 113 pages, TS 25.321 7.3.0.

"3rd Generation Partnership Project; Technical Specification Group Radio Access Network; Evolved Universal Terrestrial Radio Access (E-UTRA) Radio Resource Control (RRC); Protocol specification (Release 8)", 3GPP, Dec. 2007, 56 pages, TS 36.331 V8.0.0.

* cited by examiner

METHOD AND APPARATUS FOR HYBRID AUTOMATIC REPEAT REQUEST TRANSMISSION

CROSS REFERENCE TO RELATED APPLICATION

This application claims the benefit of U.S. provisional application No. 60/883,470 filed Jan. 4, 2007, which is incorporated by reference as if fully set forth.

FIELD OF INVENTION

The present invention is related to wireless communication.

BACKGROUND

Automatic repeat request (ARQ) is a transmission scheme that a receiver sends feedback to a transmitter informing that a data block has been decoded successfully or not, and a failed data block is retransmitted by the transmitter based on the feedback. Hybrid ARQ (HARQ) is a variance of the ARQ. In HARQ, the previously failed data block is stored in the receiver and combined with a retransmitted data block.

There are two types of HARQ schemes: chase combining and incremental redundancy. In chase combining, when the receiver detects an error in the received data block, a retransmission is requested and the incorrectly decoded data block is stored and combined with the retransmitted data block. In incremental redundancy, the retransmitted data block is coded differently from the previous failed data block, rather than simply repeating transmission of the same data block as in chase combining. Incremental redundancy gives better performance since coding and modulation are effectively performed across retransmissions. Chase combining may be considered a type of incremental redundancy.

HARQ may be used in a stop-and-wait mode or in a selective repeat mode. In the stop-and-wait mode, one data block is transmitted at a time. After each data block is transmitted, the transmitter waits until feedback, (i.e., positive acknowledgement (ACK) or negative acknowledgement (NACK)), is received. A new data block is transmitted, (or the previous data block is retransmitted), only after the feedback is received or if a timer expires. In the selective repeat mode, the HARQ process continues to send a number of data blocks specified by a window size, regardless of the feedback (ACK or NACK). The receiver keeps track of the sequence numbers of the data blocks received and informs the transmitter in the feedback. Once the transmitter has sent all the data blocks in the window, the transmitter re-sends failed data blocks indicated via a feedback channel.

In a simple stop-and-wait mode, the transmitter has to wait for the receiver's acknowledgement and this reduces system efficiency. Therefore, multiple stop-and-wait HARQ processes are usually used in parallel, wherein one HARQ process is waiting for an acknowledgement, another HARQ process may use the channel to send data.

A universal mobile telecommunication system (UMTS), (such as high speed downlink packet access (HSDPA) and high speed uplink packet access (HSUPA)), uses HARQ with chase combining or incremental redundancy with multiple stop- and wait HARQ processes in parallel. For example, for HSUPA enhanced dedicated channel (E-DCH) transmissions, a medium access control (MAC) layer in a user equipment (UE) performs E-DCH transport format combination (E-TFC) selection and delivers a transport block to the HARQ process, which handles transmission and retransmission of the transport block. For HSUPA, for the E-TFC selection, the MAC layer takes into consideration the maximum allowed puncturing, the maximum allowed UE transmit power, and the serving grant for the E-DCH, (i.e., how much power is allowed to be used by the E-DCH). However, for retransmission of a failed transport block, the same E-TFC is used, which implies that the same transport block size is used.

This causes several problems. First, the level of puncturing may be different for retransmissions in case the compressed mode used in the given frame is different. This may lead to higher puncturing, which may cause the UE to exceed its allowed puncturing, (i.e., the puncturing limit). Second, the power used by the E-DCH dedicated physical data channel (E-DPDCH) depends not only on the block size but also on the compressed mode used in the frame. The transmit power is recalculated for each retransmission, (i.e., beta factors for E-DCH are adjusted for every retransmission based on compressed mode). If the transmit power required for the retransmission is higher than the initial transmission power, the UE may exceed its maximum allowed transmit power, in which case the power is clipped to the maximum allowed power. This will result in an increase of the probability of error in the data block and consequently in an increase of the probability that the transmission will fail. The UE may also exceed its E-DCH serving grant. This will result in an increase of interference in the cell, which may affect the overall system capacity.

In a system where adaptive modulation and coding (AMC) is used, (such as 3GPP long term evolution (LTE) system), for a particular allocation of radio resources, a less robust modulation and coding scheme (MCS) allows for larger transport block sizes and a more robust MCS requires smaller transport block sizes. As a result, since the transport block size is fixed for every retransmission, the transmitter may not be able to change the MCS between retransmissions.

For LTE, it has been proposed to re-segment radio link control (RLC) protocol data units (PDUs) or RLC service data units (SDUs) if a transport block containing the RLC PDU or SDU is not transmitted successfully. However, it is proposed to be done after the HARQ process has already tried to transmit the transport block, (i.e., after all HARQ level retransmissions allowed in the specific HARQ process take place). The PDU or SDU re-segmentation is not performed at an HARQ level, but at an RLC level, which means every HARQ level retransmission is performed using the same transport block size. Therefore, the LTE system would suffer from similar problems described above.

SUMMARY

A method and apparatus for HARQ transmission are disclosed. If a packet has not been successfully transmitted, it is determined whether an HARQ early termination condition is met. If the HARQ early termination condition is met, the HARQ process is terminated and the packet is discarded at the HARQ level. The HARQ early termination condition is met if an ACK has not been received by the time the number of retransmissions of the packet reaches a predetermined limit, (that may be dynamically configured based on channel condition, measurement, etc.). Alternatively, the HARQ early termination condition is met if a transmit power required for successful transmission of the packet is much higher than an actual transmit power. Alternatively, the HARQ early termination condition is met if a transport format combination (TFC) selected for retransmission is different from, (e.g., smaller than), an optimal TFC. A higher layer may be notified of the early HARQ termination, and the packet may be retransmitted or recovered at the higher layer.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node-B" includes but is not limited to a base station, a site controller, an access point (AP), or any other type of interfacing device capable of operating in a wireless environment.

The embodiments are applicable to any wireless communication systems including, but not limited to, third generation partnership project (3GPP) UMTS, LTE, high speed packet access (HSPA) enhancements (HSPA+), and the like.

Conventional HARQ transmission process is enhanced by early HARQ termination and limiting HARQ retransmissions. If there is a high probability that the retransmission of a packet will fail, it is advantageous to terminate the HARQ process, (i.e., discard the packet at the HARQ level), and recover the packet via a higher layer processing. For example, if the required transmit power exceeds a maximum allowed transmit power, the transmit power will be clipped to the maximum value. If the transmit power required for successful transmission of the packet is much higher than the maximum transmit power, there is a very high probability that the transmission will fail. In such situation, retransmission of the packet would simply waste resources causing more interference in the system (especially when transmitting at the maximum allowed power), and increase the packet transmission delay. In this situation, the HARQ process is terminated early even though the conventional HARQ termination condition, (e.g., maximum retransmission limit has not been reached), is not met.

Figure 1:
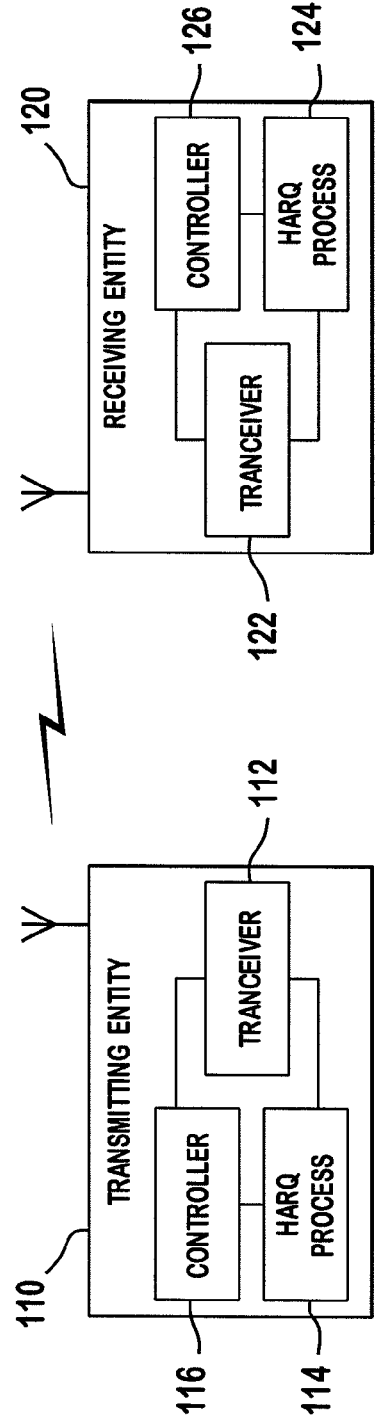
FIG. 1 shows a block diagram of an example transmitting entity and receiving entity.

FIG. 1 shows a block diagram of an example transmitting entity 110 and receiving entity 120. The transmitting entity 110 and the receiving entity 120 may be a WTRU and a Node-B, or vice versa. The transmitting entity 110 includes a transceiver 112, at least one HARQ process 114, and a controller 116. The transceiver 112 transmits a packet over a wireless channel. The HARQ process 114 transmits the packet implementing an HARQ mechanism. The controller 116 controls the HARQ process. The controller 116 determines whether an HARQ early termination condition for the packet has been met. If the HARQ early termination condition is met, the controller 116 terminates the HARQ process for the packet. The controller 116 may notify a higher layer (not shown in FIG. 1) of the HARQ early termination, (i.e., transmission failure of the packet).

The receiving entity 120 includes a transceiver 122, at least one HARQ process 124, and a controller 126. The transceiver 122 receives a packet transmitted by the transmitting entity 110 over a wireless channel. The HARQ process 124 sends an ACK or a NACK to the transmitting entity 110 based on decoding results of the received packet. The controller 126 controls the HARQ process 124. The controller 126 may set the HARQ early termination condition and send it to the transmitting entity 110. The controller 126 sets the HARQ early termination condition based on any information coming from any source, (e.g., TFC, TB size, transmit power, etc.). The controller 126 may be a packet scheduler and makes a decision to early terminate the HARQ process based on any criteria used for scheduling, (e.g., quality of service (QoS), delay, data available, or the like). For example, if a Node-B scheduler decides or indicates that another (new) packet needs to be transmitted by a WTRU, instead of retransmitting an old packet, it is indicated to the WTRU for early HARQ termination.

Figure 2:
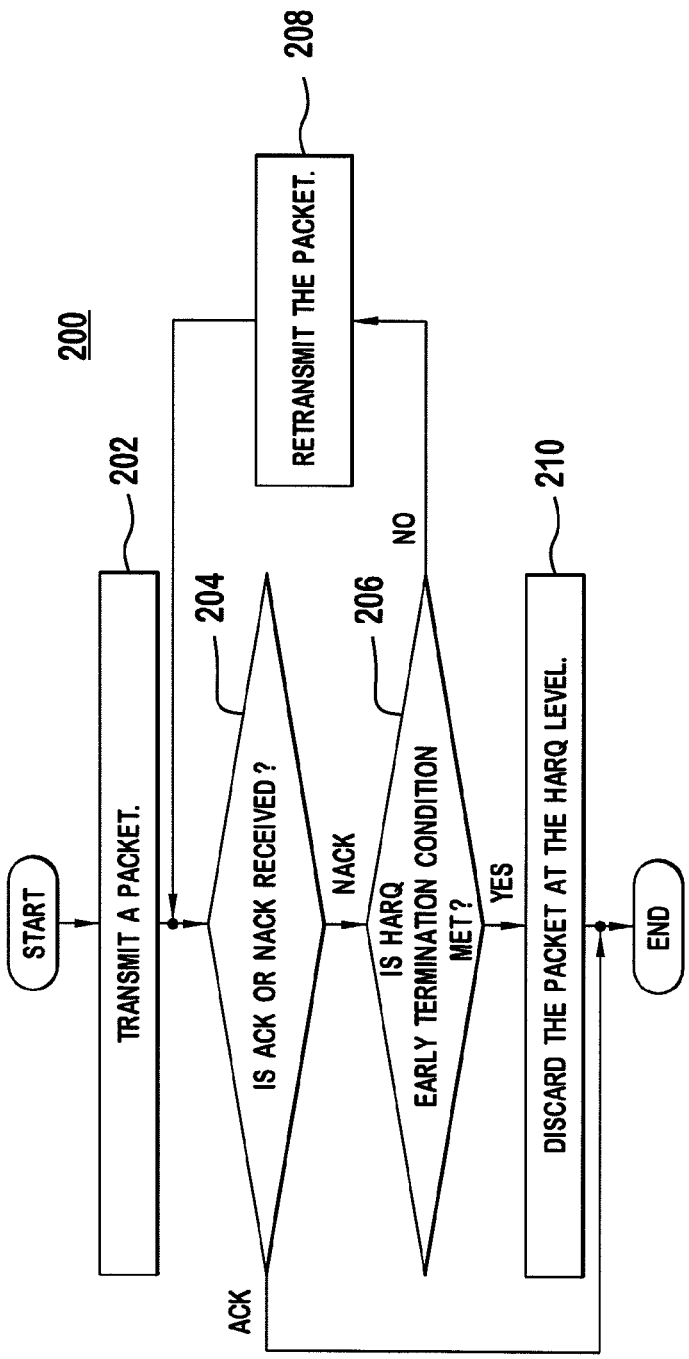
FIG. 2 is a flow diagram of an example process of transmitting a packet via an HARQ process.

FIG. 2 is a flow diagram of an example process 200 of transmitting a packet via an HARQ process. FIG. 2 shows only the steps for early HARQ termination and does not show steps of conventional HARQ termination for simplicity. It should be noted that the process 200 may be implemented with, or as part of, a conventional HARQ termination process. A transmitting entity 110 transmits a packet via an HARQ process (step 202). The transmitting entity 110 monitors whether an ACK or a NACK for the packet is received (step 204). If an ACK is received, the process 200 ends. If a NACK is received, the transmitting entity 110 determines whether an HARQ early termination condition is met (step 206). If the HARQ early termination condition is not met, the packet is retransmitted (step 208) and the process 200 returns to step 204. If the HARQ early termination condition is met, the packet is discarded at the HARQ level (step 210).

The HARQ early termination condition may be determined by the transmitting entity 110 or may be controlled by the receiving entity 120. If the early HARQ termination condition is controlled by the receiving entity 120, the receiving entity 120 may send a notice requesting an early termination of the HARQ process in a feedback channel, optionally with a NACK, and the controller 116 in the transmitting entity 110 terminates the HARQ process in response to the notice.

For example, if a Node-B decides to terminate the HARQ process of the WTRU early, the Node-B signals to the WTRU, (e.g., over a control channel), that the WTRU to stop sending, (i.e., stop retransmitting), the packet, (or equivalently, the Node-B signals that the WTRU should send a new packet, since this implies stopping of the old packet retransmission), on the HARQ process. The decision by the Node-B to early terminate the WTRU's HARQ process may be based on any information, (e.g., TFC, TB size, transmit power, or any other criteria employed by the Node-B scheduler for uplink traffic scheduling). Once the WTRU receives the signal that explicitly or implicitly indicates that the WTRU should early terminate the HARQ process, the UE terminates the HARQ process.

The HARQ early termination condition may be based on the number of retransmissions. For example, if after certain number of retransmissions an ACK is still not received, the controller 116 discards the packet and notifies a higher layer of the transmission failure. The limit may be changed dynamically as a function of at least one of the channel condition, the recent history of the number of retransmissions required for a successful transmission to and from a specific user or a specific HARQ process, measurements performed by the transmitting entity 110, measurements performed by the receiving entity 120 (which is provided to the transmitting entity 110 in a feedback channel), and the like. For example, under poor channel conditions the transmitting entity 110 may terminate the HARQ process earlier in order to use smaller block sizes and better channel coding and modulation scheme.

The limit may be set by the transmitting entity 110 or by the receiving entity 120. If the limit is set by the receiving entity 120, the receiving entity 120 may send the limit to the transmitting entity 110 via a feedback channel. Selection of the limit by the receiving entity 120 allows flexibility because the receiving entity 120 may have some information that is not available at the transmitting entity 110, allowing for better selection of the limit.

Alternatively, the HARQ early termination condition may be based on comparing the currently used transport format combination (TFC) with the optimal (or more up-to-date) TFC that is selected by TFC selection function for this transmission time interval (TTI). For example, if the transport block size selected by the TFC selection function is different, (i.e., either larger or smaller), than what the HARQ process is currently using, the HARQ process may be terminated early.

Alternatively, the HARQ early termination condition may be based on transmit power requirement. The transmit power required for successful transmission of the packet is compared with the maximum allowed transmit power. If the required transmit power is much higher than the maximum allowed transmit power, the controller 116 terminates the HARQ process and may notify a higher layer of the HARQ termination.

The HARQ early termination condition may be different for uplink and downlink transmissions. For example, in case of uplink transmissions, the maximum allowed transmit power and the power allowed by the network, (such as serving grant allocation in case of high speed uplink packet access (HSUPA) transmission), may be a factor in making the HARQ early termination decision. The transmit power required by the given transport block and the current total required transmit power (in the case where multiple channels are active in the uplink) may be compared with the maximum allowed transmit power and/or the serving grant. Based on this comparison, the transmitting entity 110 may determine if the retransmission of the transport block would most likely fail. In that case, the HARQ process is terminated early and the transport block is discarded at the HARQ level.

After early termination of an HARQ process, the controller 116 may notify a higher layer, (e.g., a medium access control (MAC) layer and/or a radio link control (RLC) layer), of the HARQ termination. The higher layer may then perform retransmission, (e.g., RLC ARQ). The higher layer may optimize transmission parameters by taking into account the fact that HARQ early termination has occurred.

Once the RLC layer decides to retransmit the packet and has re-submitted the packet to the MAC layer, the MAC layer, (e.g., a TFC selection entity), may select a new transport block size and all other relevant transmission parameters for the packet, (such as the modulation, coding, resource allocation, and the like). A new TFC may be selected for the retransmission. A more appropriate combination for the retransmission may be chosen. Additionally, a new HARQ process may be chosen if the HARQ profile of the previous HARQ process is not appropriate for the retransmission. Furthermore, based on the newly selected transport block size, the RLC layer may perform concatenation, segmentation or re-segmentation of the data that was contained in the early-terminated HARQ packet.

Although the features and elements are described in particular combinations, each feature or element may be used alone without the other features and elements or in various combinations with or without other features and elements.

The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for transmitting a packet, the method comprising:
    transmitting a packet via a hybrid automatic repeat request (HARQ) process;
    determining whether the packet has not been successfully transmitted and an HARQ early termination condition has been met, and
    responsive to the packet not being successfully transmitted and the HARQ early termination condition being met, discarding the packet at an HARQ level prior to completion of the HARQ process.

2. The method of claim 1 wherein the HARQ early termination condition is met if a positive acknowledgement (ACK) has not been received until a number of retransmissions of the packet reaches a predetermined limit, the predetermined limit being set dynamically based on any of: a channel condition, a recent history on the number of retransmissions required for a successful transmission, measurements performed by a transmitting entity, or measurements performed by a receiving entity.

3. The method of claim 1 wherein the HARQ early termination condition is met if a transmit power required for successful transmission of the packet is higher than an actual transmit power for the retransmission of the packet.

4. The method of claim 1 wherein the HARQ early termination condition is determined by a transmitting entity.

5. The method of claim 1 wherein the HARQ early termination condition is determined by a receiving entity and transmitted to a transmitting entity.

6. The method of claim 5 wherein the HARQ early termination condition is transmitted to the transmitting entity along with a negative acknowledgment (NACK).

7. The method of claim 1 wherein the HARQ early termination condition is met if a transport format combination (TFC) selected for retransmission is different from an optimal TFC.

8. The method of claim 1 wherein the HARQ early termination condition is met if a transport block (TB) size selected for retransmission is smaller than a sufficient TB size.

9. The method of claim 1 wherein the HARQ early termination condition is different for uplink and downlink transmissions.

10. The method of claim 1 further comprising:
notifying a higher layer that the packet has been discarded at the HARQ level.

11. The method of claim 10 further comprising:
retransmitting, by the higher layer, the packet.

12. The method of claim 11 further comprising:
selecting, by the higher layer, new transmission parameters for retransmission of the packet.

13. The method of claim 11 further comprising:
transmitting, via a new HARQ process, the packet.

14. The method of claim 10 further comprising:
generating at least one new packet by any of: segmenting data contained in the packet or concatenating the data with data contained in another packet; and
transmitting the new packet.

15. The method of claim 1 wherein the discarding of the packet includes discarding the packet in response to a notice from a receiving entity.

16. The method of claim 1 further comprising:
setting, the HARQ early termination condition based on packet scheduling criteria.

17. The method of claim 16 wherein the packet scheduling criteria includes any of: a quality of service (QoS), a delay, or an amount of data available.

18. The method of claim 1, further comprising:
reducing a transport block size of a subsequent packet relative to the transport block size of the packet unsuccessfully transmitted.

19. The method of claim 1, wherein the determining of whether the HARQ early termination condition has been met includes determining whether the transport block is more likely to fail.

20. The method of claim 1, further comprising:
notifying a medium access control (MAC) layer, of a termination of the HARQ process;
optimizing, by the MAC layer, transmission parameters in consideration of the termination of the HARQ process; and
performing retransmission of the packet.

21. The method of claim 1, wherein the HARQ early termination condition is based on any of: (1) a transmit power required for successful transmission; (2) a transport format combination (TFC) used for retransmission; or (3) a transport block (TB) size used for retransmission.

22. An apparatus for transmitting a packet, the apparatus comprising:
a transceiver for transmitting a packet over a wireless channel;
an HARQ mechanism implementing at least one hybrid automatic repeat request (HARQ) process for transmitting the packet; and
a controller configured to:
(1) determine whether the packet has not been successfully transmitted and an HARQ early termination condition has been met, and
(2) responsive to the packet not being successfully transmitted and the HARQ early termination condition being met, discard the packet at a HARQ level prior to completion of the HARQ process.

23. The apparatus of claim 22 wherein the HARQ early termination condition is met if a positive acknowledgement (ACK) has not been received until a number of retransmissions of the packet reaches a predetermined limit, the predetermined limit being set dynamically based on any of: a channel condition, a recent history on the number of retransmissions required for a successful transmission, or measurements.

24. The apparatus of claim 22 wherein the HARQ early termination condition is met if a transmit power required for successful transmission of the packet is higher than an actual transmit power for the packet.

25. The apparatus of claim 22 wherein the HARQ early termination condition is met if a transport format combination (TFC) selected for retransmission is different from an optimal TFC.

26. The apparatus of claim 22 wherein the HARQ early termination condition is met if a transport block (TB) size selected for retransmission is smaller than a sufficient TB size.

27. The apparatus of claim 22 further comprising:
a transport format combination (TFC) selection entity for reselecting new transmission parameters for the packet, wherein the packet processed with the new transmission parameters is retransmitted.

28. The apparatus of claim 27 wherein the packet is retransmitted via a new HARQ process.

29. The apparatus of claim 22 wherein the controller is configured to notify a higher layer that the packet has been discarded at the HARQ level.

30. The apparatus of claim 29 wherein the higher layer is configured to retransmit the packet.

31. The apparatus of claim 30 wherein the higher layer is configured to select new transmission parameters for retransmission of the packet.

32. The apparatus of claim 29 wherein the higher layer generates at least one new packet by segmenting data contained in the packet or concatenating the data with data contained in another packet, and transmits the new packet.

33. The apparatus of claim 22 wherein the controller discards the packet in response to a notice from a receiving entity.

34. The apparatus of claim 22 wherein the HARQ early termination condition is set based on packet scheduling criteria.

35. The apparatus of claim 34 wherein the packet scheduling criteria includes any of: a quality of service (QoS), a delay, or an amount of data available.

36. A wireless transmit/receive unit (WTRU) including the apparatus of claim 22.

37. A Node-B including the apparatus of claim 22.

38. A method for transmitting and receiving a packet, the method comprising:
determining a hybrid automatic repeat request (HARQ) early termination condition for a HARQ process being executed; and
sending, to a communication peer prior to completion of the HARQ process to discard the packet at a HARQ level, any of: (1) an indication to terminate a HARQ transmission conditioned on the packet not being successfully transmitted to or received from the communication peer or (2) the HARQ early termination condition for discarding the packet at a HARQ level prior to completion of the HARQ process when the packet is not successfully transmitted to or received from the communication peer.

39. The method of claim 38 wherein the HARQ early termination condition is a retransmission limit that is set dynamically based on any of: a channel condition, a recent history on the number of retransmissions required for a successful transmission, or measurements.

40. The method of claim 38 wherein the HARQ early termination condition is set based on packet scheduling criteria.

41. The method of claim 38 wherein the packet scheduling criteria includes any of: a quality of service (QoS), a delay, or an amount of data available.

42. An apparatus for transmitting and receiving a packet, the apparatus comprising:
   a transceiver for transmitting and receiving a packet over a wireless channel;
   an HARQ mechanism for implementing at least one hybrid automatic repeat request (HARQ) process for transmitting and receiving the packet; and
   a controller configured to determine an HARQ early termination condition for discarding associated packets at the HARQ level and send, to a communication peer, any of: (1) an indication to terminate an HARQ transmission conditioned on the associated packets not being successfully transmitted to or received from the communication peer; or (2) the HARQ early termination condition for discarding the packet at a HARQ level prior to completion of the HARQ process when the associated packets are not successfully transmitted to or received from the communication peer.

43. The apparatus of claim 42 wherein the HARQ early termination condition is a retransmission limit that is set dynamically based on any of: a channel condition, a recent history on a number of retransmissions required for a successful transmission, or measurements.

44. The apparatus of claim 42 wherein the controller is a packet scheduler configured to set the HARQ early termination condition based on packet scheduling criteria.

45. The apparatus of claim 44 wherein the packet scheduling criteria includes any of: a quality of service (QoS), a delay, or an amount of data available.

46. A Node-B including the apparatus of claim 42.

* * * * *